US012145283B2

(12) United States Patent
Iaccarino et al.

(10) Patent No.: US 12,145,283 B2

(45) **Date of Patent: *Nov. 19, 2024**

(54) ATTACHMENT COMB AND HAIR CUTTING APPLIANCE

(71) Applicant: KONINKLIJKE PHILIPS N.V., Eindhoven (NL)

(72) Inventors: Luca Iaccarino, Groningen (NL); Britt Roumen, Nuis (NL); Martinus Bernardus Stapelbroek, Frieschepalen (NL); Jan Bennik, Urk (NL); John Pragt, De Wilgen (NL); Remy Amos Abraham Ripandelli, Zuidhorn (NL); Robbert Freerk Johan Van Der Scheer, Groningen (NL); Albert Jan Aitink, Drachten (NL); Roland Van Straaten, Groningen (NL); Everhardus Johannes Hoexum, Groningen (NL); Jan Van Dalen, Donkerbroek (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 3 days.

This patent is subject to a terminal disclaimer.

(21) Appl. No.: 16/916,256

(22) Filed: Jun. 30, 2020

(65) Prior Publication Data

US 2020/0331156 A1 Oct. 22, 2020

Related U.S. Application Data

(63) Continuation of application No. 15/302,381, filed as application No. PCT/EP2015/057996 on Apr. 14, 2015, now Pat. No. 10,730,197.

(30) Foreign Application Priority Data

Apr. 18, 2014 (EP) .................................... 14165286

(51) Int. Cl.

| | |
|---|---|
| ***B26B 19/06*** | (2006.01) |
| ***A45D 24/36*** | (2006.01) |
| ***B26B 19/20*** | (2006.01) |

(52) U.S. Cl.

CPC ............ *B26B 19/063* (2013.01); *B26B 19/20* (2013.01); *A45D 24/36* (2013.01)

(58) Field of Classification Search

CPC ....... B26B 19/20; B26B 19/063; B26B 19/06; B26B 19/3813; B26B 19/3853;

(Continued)

(56) References Cited

U.S. PATENT DOCUMENTS

| | | | | |
|---|---|---|---|---|
| 1,359,031 A * | 11/1920 | Coffman | B26B 19/063 | 30/199 |
| 2,067,075 A | 1/1937 | Clark | | |

(Continued)

FOREIGN PATENT DOCUMENTS

| | | |
|---|---|---|
| CH | 353651 | 4/1961 |
| CN | 201889807 | 7/2011 |

(Continued)

*Primary Examiner* — Evan H Macfarlane

(57) ABSTRACT

A hair cutting appliance is configured to be moved through hair in a moving direction in order to cut hair. The hair cutting appliance includes a housing portion, a blade set having a skin-facing top surface, and a releasable attachment comb. The blade set is arranged pivotably with respect to the housing portion. The attachment comb includes a supporting frame, at least one spacing guard element configured to space the blade set from a working surface when in operation, a mounting portion configured to be attached to a housing portion of the hair cutting appliance, and an orientation determining portion configured to engage the blade set and to define a locking orientation of the blade set when mounted to the hair cutting appliance.

19 Claims, 8 Drawing Sheets

(58) Field of Classification Search
CPC ..... B26B 19/10; B26B 19/22; B26B 19/3806; B26B 19/40; B26B 19/02; B26B 19/048; B26B 19/12; B26B 19/205; A45D 24/36
USPC ........... 30/233, 233.5, 200, 201, 216, 43–46
See application file for complete search history.

(56) References Cited

U.S. PATENT DOCUMENTS

| | | | | | |
|---|---|---|---|---|---|
| 4,164,036 | A | | 8/1979 | Wax | |
| 4,557,050 | A | * | 12/1985 | Haraguchi | B26B 19/20 30/195 |
| 4,581,822 | A | * | 4/1986 | Fujimura | B26B 19/3846 30/220 |
| 4,614,036 | A | | 9/1986 | Haraguchi | |
| D355,506 | S | * | 2/1995 | Rizzuto, Jr. | D28/54 |
| 6,276,060 | B1 | * | 8/2001 | Faulstich | B26B 19/20 30/34.1 |
| 6,301,786 | B1 | * | 10/2001 | Oswald | B26B 19/048 30/527 |
| D463,623 | S | * | 9/2002 | Kling | D28/54 |
| 6,505,404 | B2 | | 1/2003 | Ullmann | |
| 8,191,262 | B2 | * | 6/2012 | Palmer | B26B 19/386 30/34.05 |
| 8,458,914 | B2 | * | 6/2013 | Voorhorst | B26B 19/063 30/210 |
| 10,730,197 | B2 | * | 8/2020 | Laccarino | B26B 19/20 |
| 2002/0092178 | A1 | | 7/2002 | Fung | |
| 2004/0006873 | A1 | | 1/2004 | Cutting | |
| 2008/0047145 | A1 | * | 2/2008 | Dietzel | B26B 19/20 30/45 |
| 2008/0313909 | A1 | * | 12/2008 | Haczek | B26B 19/20 30/45 |
| 2011/0308087 | A1 | | 12/2011 | Rehbein | |
| 2012/0240414 | A1 | | 9/2012 | Wevers | |
| 2017/0028574 | A1 | | 2/2017 | Iaccarino | |

FOREIGN PATENT DOCUMENTS

| | | | | | |
|---|---|---|---|---|---|
| CN | 202318376 | | | 7/2012 | |
| EP | 1740354 | | | 1/2007 | |
| EP | 2055449 | | | 5/2009 | |
| EP | 2145740 | | | 1/2010 | |
| EP | 2145740 | A1 | * | 1/2010 | B26B 19/20 |
| JP | 54143372 | A | * | 11/1979 | B26B 19/20 |
| WO | 2009081301 | | | 7/2009 | |
| WO | 2010112135 | A1 | | 10/2010 | |
| WO | 2013150412 | | | 10/2013 | |

* cited by examiner

ATTACHMENT COMB AND HAIR CUTTING APPLIANCE

CROSS-REFERENCE TO RELATED APPLICATION

This application is a Continuation of U.S. patent application Ser. No. 15/302,381 filed on Oct. 6, 2016, which is the U.S. National Phase application under 35 U.S.C. § 371 of International Application No. PCT/EP2015/057996 filed on Apr. 14, 2015, which claims the benefit of European Application No. 14165286.7 filed on Apr. 18, 2014. These applications are hereby incorporated by reference herein.

FIELD OF THE INVENTION

The present disclosure relates to an attachment comb for a hair cutting appliance. The present disclosure further relates to a hair cutting appliance that can be fitted with an attachment comb. More particularly, the present disclosure relates to a hair cutting appliance that is operable in a hair trimming mode and in a shaving mode.

BACKGROUND OF THE INVENTION

WO 2013/150412 A1 discloses a hair cutting appliance and a corresponding blade set of a hair cutting appliance. The blade set comprises a stationary blade and a movable blade, wherein the movable blade can be reciprocatingly driven with respect to the stationary blade for cutting hair. The blade set is particularly suited for enabling both trimming and shaving operations.

For the purpose of cutting body hair, there exist basically two customarily distinguished types of electrically powered appliances: the razor, and the hair trimmer or clipper. Generally, the razor is used for shaving, i.e. slicing body hairs at the level of the skin so as to obtain a smooth skin without stubbles. The hair trimmer is typically used to sever the hairs at a chosen distance from the skin, i.e. for cutting the hairs to a desired length. The difference in application is reflected in the different structure and architectures of the cutting blade arrangement implemented on either appliance.

An electric razor typically includes a foil, i.e. an ultra-thin perforated screen, and a cutter blade that is movable along the inside of and with respect to the foil. During use, the outside of the foil is placed and pushed against the skin, such that any hairs that penetrate the foil are cut off by the cutter blade that moves with respect to the inside thereof, and fall into hollow hair collection portions inside the razor.

An electric hair trimmer, on the other hand, typically includes generally two cutter blades having a toothed edge, one placed on top of the other such that the respective toothed edges overlap. In operation, the cutter blades reciprocate relative to each other, cutting off any hairs that are trapped between their teeth in a scissor action. The precise level above the skin at which the hairs are cut off is normally determined by means of an additional attachable part, called a (spacer) guard or comb.

Furthermore, combined devices are known that are basically adapted to both shaving and trimming purposes. However, these devices merely include two separate and distinct cutting sections, namely a shaving section comprising a setup that matches the concept of powered razors as set out above, and a trimming section comprising a setup that, on the other hand, matches the concept of hair trimmers.

Common electric razors are not particularly suited for cutting hair to a desired variable length above the skin, i.e., for precise trimming operations. This can be explained, at least in part, by the fact that they do not include mechanisms for spacing the foil and, consequently, the cutter blade from the skin. But even if they did, e.g. by adding attachment spacer parts, such as spacing combs, the configuration of the foil, which typically involves a large number of small perforations, would diminish the efficient capture of all but the shortest and stiffest of hairs.

Similarly, common hair trimmers are not particularly suited for shaving, primarily because the separate cutter blades require a certain rigidity, and therefore thickness, to perform the scissor action without deforming. It is the minimum required blade thickness of a skin-facing blade thereof that prevents hair from being cut off close to the skin. Consequently, a user desiring to both shave and trim his/her body hair may need to purchase and apply two separate appliances.

Furthermore, combined shaving and trimming devices show several drawbacks since they basically require two cutting blade sets and respective drive mechanisms. Consequently, these devices are heavier and more susceptible to wear than standard type single-purpose hair cutting appliances, and also require costly manufacturing and assembling processes. Similarly, operating these combined devices is often experienced to be rather uncomfortable and complex. Even in case a conventional combined shaving and trimming device comprising two separate cutting sections is utilized, handling the device and switching between different operation modes may be considered as being time-consuming and not very user-friendly. Since the cutting sections are typically provided at different locations of the device, guidance accuracy (and therefore also cutting accuracy) may be reduced, as the user needs to get used to two distinct dominant holding positions during operation.

The above WO 2013/150412 A1 tackles some of these issues by providing a blade set comprising a stationary blade that houses the movable blade such that a first portion of the stationary blade is arranged at the side of the movable blade facing the skin, when used for shaving, and that a second portion of the stationary blade is arranged at the side of the movable blade facing away from the skin when in use. Furthermore, at a toothed cutting edge, the first portion and the second portion of the stationary blade are connected, thereby forming a plurality of stationary teeth that cover respective teeth of the movable blade. Consequently, the movable blade is guarded by the stationary blade.

This arrangement is advantageous insofar as the stationary blade may provide the blade set with increased strength and stiffness since the stationary blade is also present at the side of the movable blade facing away from the skin. This may generally enable a reduction of the thickness of the first portion of the stationary blade at the skin-facing side of the movable blade. Consequently, since in this way the movable blade may come closer to the skin during operation, the above blade set is well-suited for hair shaving operations. Aside from that, the blade set is also particularly suited for hair trimming operations since the configuration of the cutting edge, including respective teeth alternating with slots, also allows longer hairs to enter the slots and, consequently, to be cut by the relative cutting motion between the movable blade and the stationary blade.

However, there is still a need for improvement in hair cutting appliances. This may particularly involve user comfort related aspects and performance related aspects. Particularly with hair cutting appliances comprising blade sets that are pivotably attached to the housing, operating the appliance in different distinct operation modes may pose several challenges. Particularly reliably spacing the blade set of such an appliance from a user's skin may be difficult.

SUMMARY OF THE INVENTION

It is an object of the present disclosure to provide an attachment comb arranged for trimming operations that can be easily attached to and detached from a hair cutting appliance. More preferably, the present disclosure may address at least some drawbacks inherent in known prior art hair cutting appliances as discussed above, for instance. It is further preferred to provide a hair cutting appliance arranged to be selectively operated in a shaving mode and in a trimming mode. It is particularly preferred that the attachment comb enhances the trimming performance of the hair cutting appliance.

In a first aspect of the present disclosure a hair cutting appliance arranged to be moved through hair in a moving direction to cut hair is presented, said hair cutting appliance comprising a blade set, particularly a pivotably mounted blade set, and an attachment comb, said attachment comb comprising:

- a supporting frame,
- at least one spacing guard element arranged to space the blade set from a working surface when in operation, particularly to space a skin-facing side thereof from a user's skin,
- a mounting portion arranged to be attached to a housing portion of the hair cutting appliance, and
- an orientation determining portion arranged to engage the blade set and to define a locking orientation of the blade set when mounted to the hair cutting appliance.

This aspect is based on the insight that the attachment comb may serve several purposes. On the one hand side, the attachment comb may space the blade set from the skin so as to define the length of the (remaining) hair. On the other hand, the attachment comb may activate the trimming mode at the device by bringing the blade set into a desired orientation, e.g. a trimming orientation. It is preferred that the blade set is locked in the trimming mode, i.e. that the blade set cannot be pivoted with respect to the housing of the appliance. It goes without saying that the blade set as such is still operable in the locking orientation, i.e. a movable cutter blade of the blade set may be moved with respect to a stationary blade of the blade set. It is further preferred that the attachment comb may actuate or induce the locking orientation upon being mounted to the hair cutting appliance.

In the shaving mode, when the attachment comb is detached from the hair cutting appliance, the blade set may be pivoted with respect to the housing, thereby providing a contour-following capability. As a result of the removal of the attachment comb, the blade set may be released from its relatively fixed orientation in the locking configuration. Consequently, the blade set again may be pivoted or swiveled with respect to the housing portion in the shaving mode.

It is worth mentioning in the context that the attachment comb preferably may be mounted to hair cutting appliances that comprise blade sets that are arranges as dual-purpose or multi-purpose blade sets. Consequently, the same blade set may be utilized for trimming and for shaving.

In one embodiment, the orientation determining portion is arranged to block a swiveling mechanism that couples the blade set and the housing portion of the hair cutting appliance. Blocking the swiveling mechanism may involve blocking the blade set attached thereto. In the alternative, or in addition, blocking the swiveling mechanism may involve blocking an element of the swiveling mechanism to which the blade set is attached, for instance a bar of a four-bar linkage mechanism.

In one embodiment, the mounting portion further comprises at least one retaining element, particularly at least one resilient snap-on hook, wherein the at least one retaining element is arranged to engage a mounting contour at the housing portion, and wherein the at least one retaining element biases against the mounting contour when mounted to the hair cutting appliance. Preferably, the at least one retaining element can be actuated without the need of directly operating the retaining element, i.e. without the need of directly pushing of pulling the retaining element. Consequently, the at least one retaining element may be arranged as a mediately actuable or, rather, a self-actuable retaining element.

In one embodiment, the at least one retaining element is a pretensioned mounting element, particularly a flexible resilient mounting element or a spring-pretensioned mounting element. Consequently, a locking force may be generated. As a result, the attachment comb may be urged or biased into the desired position with respect to the hair cutting appliance and its blade set.

In one embodiment, the at least one retaining element is rotatably attached to or integrally formed at the supporting frame, and wherein the supporting frame contacts the at least one retaining element and the orientation determining portion. Hence, the at least one retaining element may apply a locking force to the frame and, consequently, to the orientation determining portion that may contact the blade set.

In one embodiment, the at least one retaining element is arranged to apply an alignment force to the housing portion when mounted to the hair cutting appliance, wherein the alignment force urges the orientation determining portion into engagement with the blade set, and wherein the blade set is urged into the locking orientation.

In one embodiment, the at least one retaining element comprises a sliding surface arranged to cooperate with a sliding ramp surface associated with mounting contour, wherein the sliding surface and the sliding ramp surface deflect the at least one retaining element upon mounting the attachment comb such that a retaining surface of the retaining element engages an engagement surface associated with the mounting contour. This may have the advantage that the retaining element may automatically engage the mounting contour in the course of mounting the attachment comb.

In one embodiment, the attachment comb further comprises a handling tab, particularly a disengagement handling tab actuable by a user, wherein the at least one retaining element is disengaged from the mounting contour upon applying a disengagement force to the handling tab.

Disengaging the retaining element may involve deflecting or flexing the retaining element such that the retaining surface may be released from the engagement surface. Preferably, disengaging may involve pivoting the retaining element such that the retaining surface may overcome an apex point between the engagement surface and the sliding ramp surface of the mounting contour.

In one alternative embodiment, the handling tab is coupled to the at least one retaining element, and wherein the handling tab is selectively actuable to disengage the least one retaining element from the housing portion. In accordance with this embodiment, the user may directly actuate the retaining element to disengage or engage the retaining element.

In one embodiment, the orientation determining portion swivels the blade set against a swivel limit stop member associated with the housing portion. As a result, the blade set may be kept with relatively high accuracy in the desired locking orientation.

In an alternative embodiment, the orientation determining portion swivels the blade set against a blade set orientation biasing force applied by a biasing element associated with the housing portion. By way of example, the swiveling mechanism may be provided with the biasing element. Generally, the biasing element may urge the swiveling mechanism and, consequently, the blade set into a neutral position. As a result of the attachment of the attachment comb, the orientation determining portion may bias the blade set against the biasing force applied by the biasing element into the desired locking orientation.

In one embodiment, the attachment comb is arranged as a hair trimming comb, wherein the orientation determining portion is arranged to induce a trimming orientation of the blade set when the attachment comb is mounted to the hair cutting appliance, wherein the trimming orientation particularly involves a defined angular orientation of the blade set with respect to the housing portion. The attachment comb may comprise a plurality of comb teeth that may space the blade set from the skin when in operation.

In one embodiment, the attachment comb further comprises an insertion portion adjacent to the orientation determining portion, wherein the insertion portion is configured to facilitate imposing or putting the attachment comb on the blade set in a mounting direction. Consequently, assembly faults may be avoided. The mounting process can be further simplified.

In one embodiment, the mounting direction is adapted to a standard orientation of the blade set with respect to the housing portion. As indicated above, the blade set may assume a standard or neutral orientation when no external load is applied thereto. It is therefore particularly beneficial to adapt the insertion portion to the standard orientation of the blade set.

Mounting the attachment comb may involve approaching the blade set in the mounting direction and, having contacted the blade set with the orientation determining portion, swivel the attachment comb about laterally extending axis that may be basically parallel to the pivot axis or virtual pivot axis of the blade set.

In one embodiment, the mounting portion further comprises at least one side clip element, particularly a first side clip element and a second side clip element opposite to the first side clip element, wherein the at least one side clip element is configured to engage the housing portion upon swiveling the attachment comb into a mounting orientation, thereby urging the blade set into the locking orientation.

In a related embodiment, the mounting portion comprises a first side clip element and a second side clip element, wherein the first side clip element and the second side clip element are arranged to embrace the housing portion when the attachment comb is mounted to the hair cutting appliance, wherein the first side clip element and the second side clip element exert opposite retaining forces, wherein the preferably opposite retaining forces are preferably perpendicular to an alignment force applicable by a retaining element. However, several embodiments can be envisaged that may be implemented without side clip elements.

In one embodiment of the hair cutting appliance, the appliance is operable to shave hair in a shaving mode, wherein the blade set is configured to swivel in the shaving mode, wherein an actual orientation of the blade set is adaptable to a working surface, particularly to a user's skin, and wherein the appliance, being equipped with the attachment comb, is operable to trim hair in a trimming mode, wherein the blade set is urged into the locking orientation by means of the attachment comb in the trimming mode.

In a further aspect of the present disclosure a releasable attachment comb for a blade set of a hair cutting appliance, particularly for a pivotably supported blade set, is presented.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE INVENTION

Figure 1:
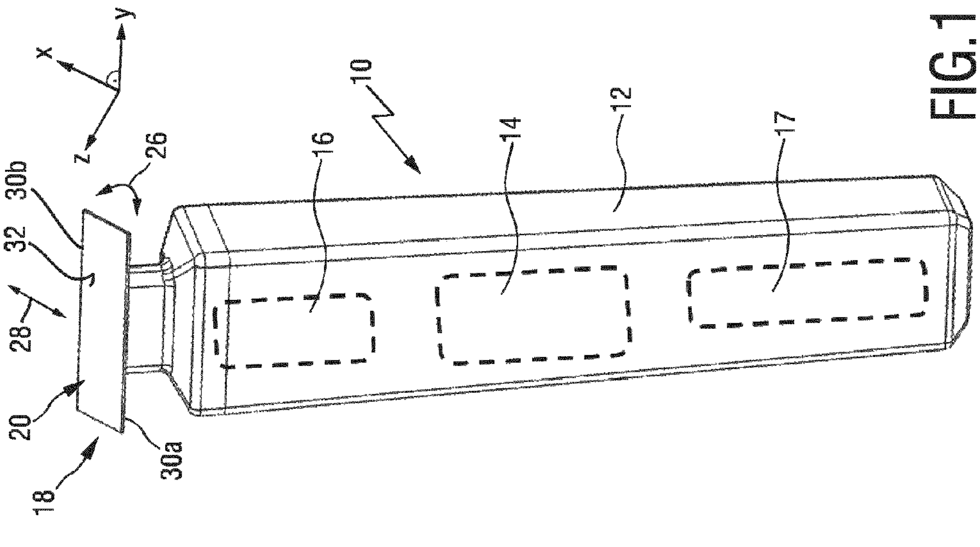
FIG. 1 shows a schematic perspective view of an exemplary electric hair cutting appliance that may be fitted with an exemplary embodiment of an attachment comb in accordance with the present disclosure.
Figure 3:
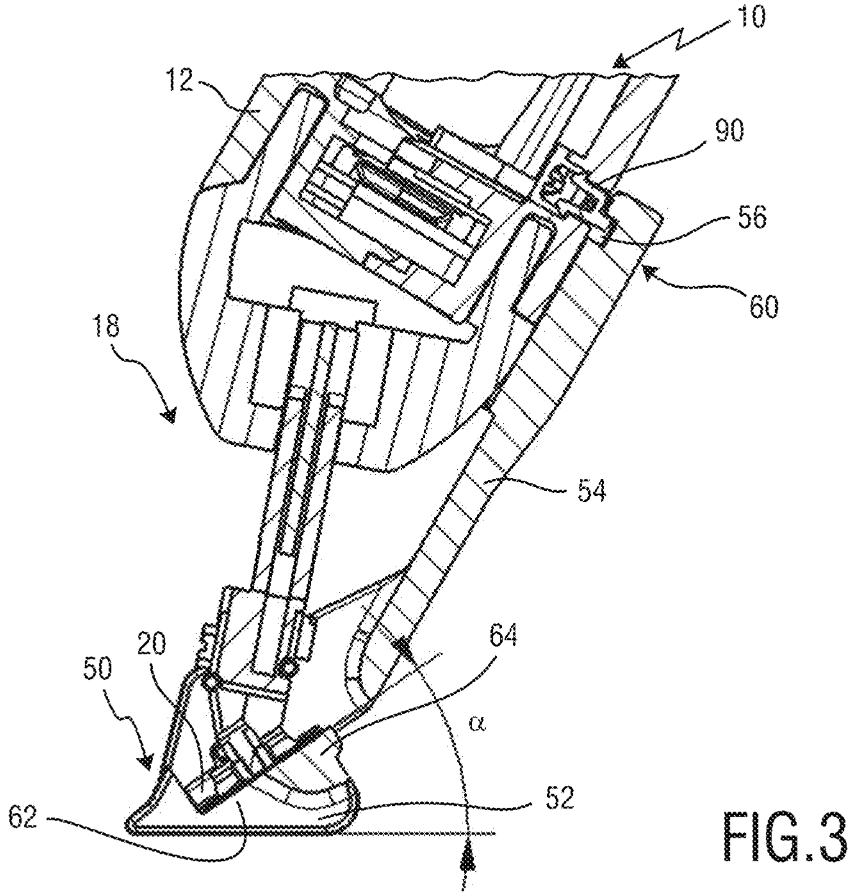
FIG. 3 is a partial cross-sectional side view of a hair cutting appliance fitted with an exemplary embodiment of an attachment comb in accordance with the present disclosure.

FIG. 1 schematically illustrates, in a simplified perspective view, an exemplary embodiment of a hair cutting appliance 10, particularly an electric hair cutting appliance 10. The cutting appliance 10 may comprise a housing or, more particularly, a housing portion 12, a motor indicated by a dashed block 14 in the housing portion 12, and a drive mechanism or drivetrain indicated by a dashed block 16 in a housing portion 12. For powering the motor 14, at least in some embodiments of the cutting appliance 10, an electrical battery, indicated by a dashed block 17 in the housing portion 12, may be provided, such as, for instance, a rechargeable battery, a replaceable battery, etc. However, in some embodiments, the cutting appliance 10 may be further provided with a power cable for connecting a power supply. A power supply connector may be provided in addition or in the alternative to the (internal) electric battery 17.

The cutting appliance 10 may further comprise a cutting head 18. At the cutting head 18, a blade set 20 may be attached to the hair cutting appliance 10. The blade set 20 may be driven by the motor 14 via the drive mechanism or drivetrain 16 to enable a cutting motion. The cutting motion may generally be regarded as a relative motion between a stationary blade and a movable blade which will be further described and discussed hereinafter. Generally, a user may grasp, hold and manually guide the cutting appliance 10 through hair in a moving direction 28 to cut hair. The cutting appliance 10 may be generally regarded as a hand-guided and hand-operated electrically powered device. Furthermore, the cutting head 18 or, more particularly, the blade set 20 can be connected to the housing portion 12 of the cutting appliance 10 in a pivotable manner, refer to the curved double-arrow indicated by reference numeral 26 in FIG. 1. In some embodiments, the cutting appliance 10 or, more specifically, the cutting head 18 including the blade set 20 can be moved along skin to cut hair growing at the skin. When cutting hair closely to the skin, basically a shaving operation can be performed aiming at cutting or chopping hair at the level of the skin. However, also clipping (or trimming) operations may be envisaged, wherein the cutting head 18 comprising the blade set 20 is passed along a path at a desired distance relative to the skin.

When being guided moved through hair, the cutting appliance 10 including the blade set 20 is typically moved along a common moving direction which is indicated by the reference numeral 28 in FIG. 1. It is worth mentioning in this connection that, given that the hair cutting appliance 10 is typically manually guided and moved, the moving direction 28 thus not necessarily has to be construed as a precise geometric reference having a fixed definition and relation with respect to the orientation of the hair cutting appliance 10 and its cutting head 18 fitted with the blade set 20. That is, an overall orientation of the hair cutting appliance 10 with respect of the to-be-cut hair at the skin may be construed as somewhat unsteady. However, for illustrative purposes, it may be fairly assumed that the (imaginary) moving direction 28 is parallel (or generally parallel) to a main central plane of a coordinate system which may serve in the following as a means for describing structural features of the hair cutting appliance 10.

For ease of reference, coordinate systems are indicated in several drawings herein. By way of example, a Cartesian coordinate system X-Y-Z is indicated in FIG. 1. An axis X of the respective coordinate system extends in a generally longitudinal direction that is generally associated with length, for the purpose of this disclosure. An axis Y of the coordinate system extends in a lateral (or transverse) direction associated with width, for the purpose of this disclosure. An axis Z of the coordinate system extends in a height (or vertical) direction which may be referred to for illustrative purposes, at least in some embodiments, as a generally vertical direction. It goes without saying that an association of the coordinate system X-Y-Z to characteristic features and/or embodiments of the hair cutting appliance 10 is primarily provided for illustrative purposes and shall not be construed in a limiting way. It should be understood that those skilled in the art may readily convert and/or transfer the coordinate system provided herein when being confronted with alternative embodiments, respective figures and illustrations including different orientations. It is further worth mentioning that, for the purpose of the present disclosure, the coordinate system X-Y-Z is generally aligned with main directions and orientations of the cutting head 18 including the blade set 20.

Figure 2:
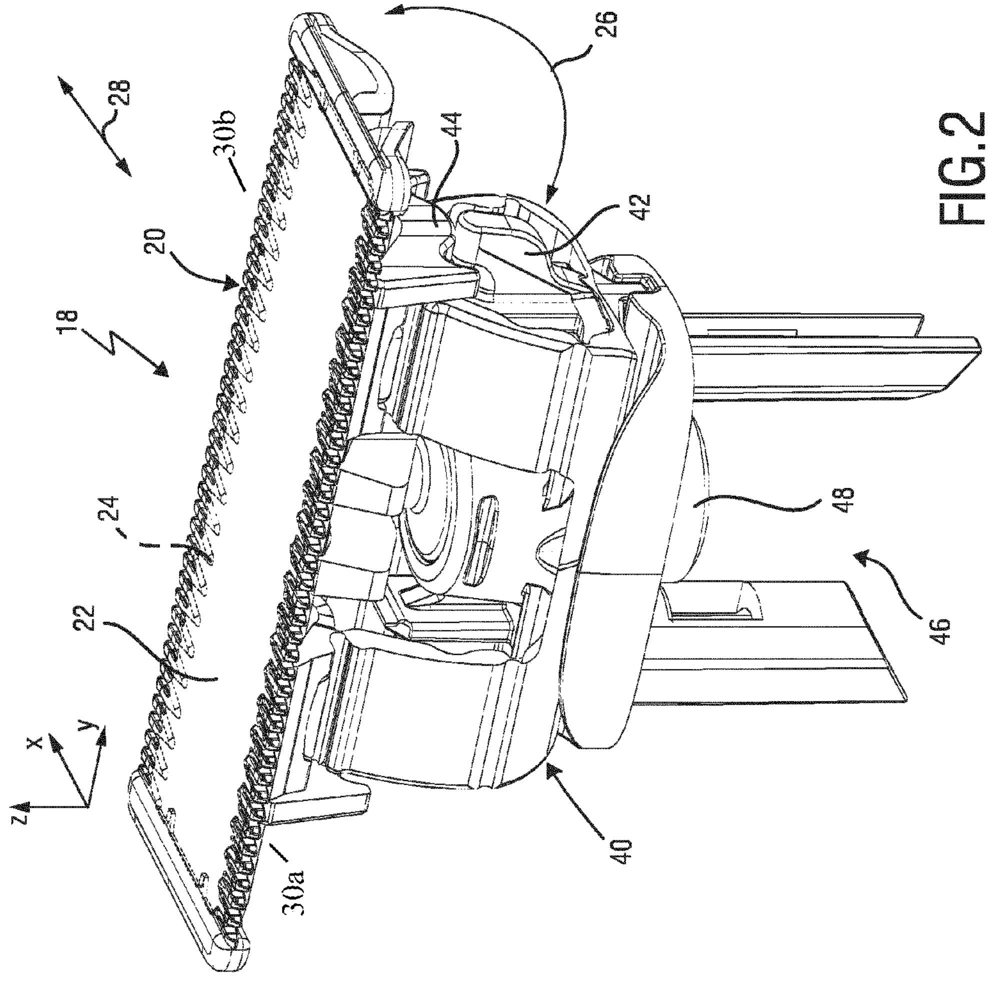
FIG. 2 shows is a perspective top view of a cutting head including a blade set for a hair cutting appliance.

FIG. 2 shows a perspective top of a blade set 20 that may be implemented in the cutting head 18 illustrated in FIG. 1. The stationary blade 22 of the blade set 20 may define at least one toothed leading edge 30*a*, 30*b* comprising a plurality of teeth. Also the moveable cutter blade 24 may comprise respective toothed leading edges provided with respective teeth. The moveable cutter blade 24 is indicated in FIG. 2 in a dashed representation. The moveable blade 24 may be driven by a drive shaft 48 in a reciprocating manner. Consequently, the moveable blade 24 and the stationary blade 22 may be reciprocatingly moved with respect to each other and therefore cooperate to cut hairs that enter slots between the teeth at the at least one toothed leading edge 30*a*, 30*b* when the hair cutting appliance 10 is moved through hair in the moving direction 28. As already indicated above, the blade set 20 may be particularly suited for shaving and trimming operations. Shaving performance may be further improved when the blade set 20 is capable of following an actual skin contour. Consequently, it may be preferred that the blade set 20 is pivotably attachable to the housing or housing portion 12 of the hair cutting appliance 10.

The stationary blade 22 may be arranged as a guard for the moveable blade 24. It is particular preferred that the stationary blade 22 comprises a first wall portion and a second wall portion which are at least partially spaced from each other such that a guide slot for the moveable blade 24 is defined therebetween. Hence, the stationary blade 22 may also cover the moveable blade 24 at the at least one toothed leading edge 30*a*, 30*b*. The blade set 20 may be attached to a swiveling mechanism 40. The swiveling mechanism 40 may form a part of the cutting head 18 that is interposed between the blade set 20 and the housing portion 12. The swiveling mechanism 40 may define a pivot or, rather, a virtual pivot for the blade set 20, refer to the curved double-arrow 26 in FIGS. 1 and 2.

The swiveling mechanism 40 may further comprise a limit stop 42 to define a maximum swiveling angle of the blade set 20 with respect to the housing portion 12. At least one contact surface 44 may be associated with the blade set 20. Consequently, when the blade set 20 is pivoted about the pivot axis or the virtual pivot axis, the contact surface 44 may contact the limit stop 42 and therefore limit the pivoting motion. The cutting head 18 may be regarded as a replaceable cutting head. The cutting head 18 may comprise an attachment interface 46 which is arranged to engage a respective receiving interface at the housing portion 12 of the hair cutting appliance 10. Particularly, the cutting head 18 may be arranged as a plug-in cutting head 18. As already indicated above, the blade set 20, particularly the moveable cutter blade 24 thereof, may be coupled to the drive shaft 48. The drive shaft 48 may comprise an eccentric portion that may revolve about a longitudinal axis of the drive shaft 48. Consequently, an eccentric cutting mechanism may be provided for reciprocatingly driving the moveable cutter blade 24 with respect to the stationary blade 22.

Being fitted with the swiveling mechanism 40 illustrated in FIG. 2 or with another exemplary embodiment of a swiveling mechanism 40, the cutting head 18 may be particularly suited for shaving operations. However, it is preferred that the cutting head 18 is also suited for hair trimming operations. Hair trimming may involve cutting hairs at a desired length. The desired remaining length of the hairs may be defined with a so-called attachment comb. An attachment comb may generally space the blade set 20 from a skin surface. When attaching the attachment comb to the hair cutting appliance 10, it has to be considered that the blade set 20 is basically pivotably mounted at the housing portion 12. The pivotable mounting may improve the shaving performance of the hair cutting appliance 10. However, on the other hand, it might be preferred to lock or block the orientation of the blade set 20 in the trimming mode. Locking the blade set 20 may involve maintaining the blade set 20 in a desired trimming orientation.

With reference to FIGS. 3 to 17, exemplary embodiments of attachment combs 50 will be illustrated and further described. With particular reference to FIGS. 3 to 7, a first exemplary embodiment of an attachment comb 50 will be elucidated. As can be best seen from FIGS. 3 and 4, the attachment comb 50 may comprise a supporting frame 52. The supporting frame 52 may comprise a support beam 54 which may be arranged to engage a housing portion 12 of the hair cutting appliance 10. To this end, a locking engagement element 56 may be attached to the support beam 54. The attachment comb 50 may generally comprise a mounting portion 60 which is arranged to define a predefined orientation of the attachment comb 50 with respect to the housing portion 12. The mounting portion 60 may be provided with the locking engagement element 56, for instance. The locking engagement element 56 may be arranged to engage a mounting contour 90, particularly a mounting recess at the housing portion 12. As can be best seen from the cross-sectional representation of the cutting head 18 of the hair cutting appliance 10 in FIG. 3, the cutting head 18 may comprise a blade set 20 which is pivotably connected to the housing portion 12. However, when the attachment comb 50 is attached to the hair cutting appliance 10, in a trimming mode, it is preferred that the blade set 20 is brought into and maintained in a preferred trimming orientation which may also be referred to as locking orientation. The locking orientation of the blade set may involve a preferred angular orientation. In other words, the blade set 20 may be arranged at an angle α with respect to the attachment comb 50 and, consequently, to the housing portion 12.

The attachment comb 50 may further comprise an orientation determining portion 62. The orientation determining portion 62 may be arranged to define the locking orientation or trimming orientation of the blade set 20 when the attachment comb 50 is attached to the housing portion 12 and the blade set 20 in a predefined manner. By way of example, the orientation determining portion 62 may comprise a receiving seat 64 which may be arranged to contact the top surface 32 (refer to FIG. 5) of the blade set 20, at least sectionally. Having assumed its predetermined orientation, the attachment comb 50 may basically urge the blade set 20 into the locking orientation.

Figure 4:
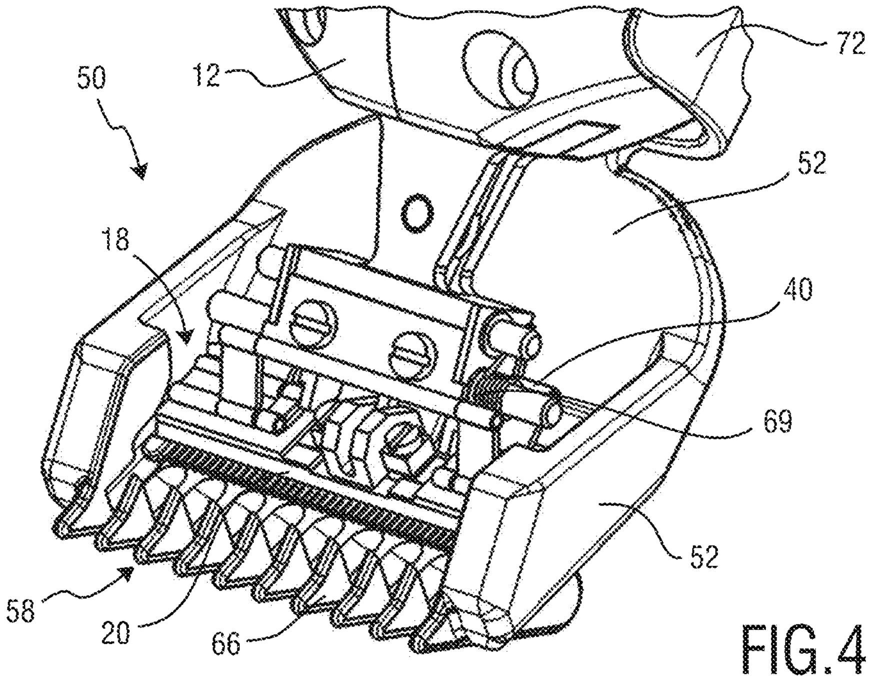
FIG. 4 is a partial perspective view of a cutting head of a hair cutting appliance fitted with an attachment comb in accordance with FIG. 3.

As can be best seen from the perspective view of FIG. 4, the attachment comb 50 may further comprise a spacing guard element 58 which may involve a plurality of comb teeth 66. The comb teeth 66 may be arranged to contact the user's skin when the hair cutting appliance 10 is used for hair trimming operations. The spacing guard element 58, particularly the comb teeth 66 thereof, may offset the toothed leading edge 30*a* of the blade set 20 from the skin and therefore define an actual (remaining) length of hair. As can be further seen from FIG. 4, the blade set 20 may be attached to a swiveling mechanism 40 which may be arranged as a four-bar linkage mechanism. The swiveling mechanism 40 may comprise a biasing element 69, particularly a spring element 69, refer to FIG. 4. The biasing element 69 may be arranged to urge the blade set into a predefined neutral position. The neutral position may be regarded as the position of the blade set 20 that is assumed when no external load is applied to the blade set 20. Consequently, the orientation determining portion 62 may act against the spring element 69 to urge the blade set 20 into the locking orientation desired for trimming purposes.

As can be further seen from FIG. 4, the attachment comb 50 may basically comprise a shovel-like shape. The supporting frame 52 and the spacing guard element 58 may guard the top surface 32 of the blade set 20. As can be best seen from FIG. 5, the mounting portion 60 may be arranged to be put on the blade set 20 in a mounting direction 74. The attachment comb 50 may further comprise a defined insertion portion 70 which may basically comprise a slot that is adapted to a lateral extension (Y-dimension) of the blade set, refer also to FIG. 2. When the orientation determining portion 62 is put on the blade set 20, the blade set 20 may enter the insertion portion 70. The blade set 20 may be brought into contact with the receiving seat 64. At a front end thereof, particularly at a toothed leading edge 30*a* thereof, the blade set 20 may be brought in contact with a frontal contact surface 67.

Figure 5:
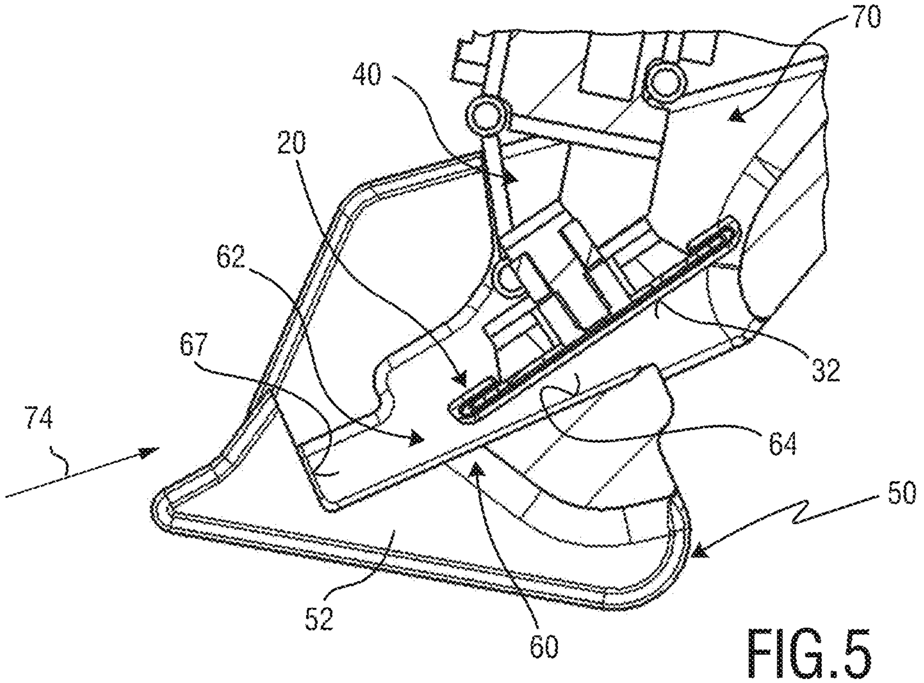
FIG. 5 is a partial side view of a hair cutting appliance illustrating a mounting process for an attachment comb, wherein an orientation determining portion is fed to a blade set of the appliance.
Figure 6:
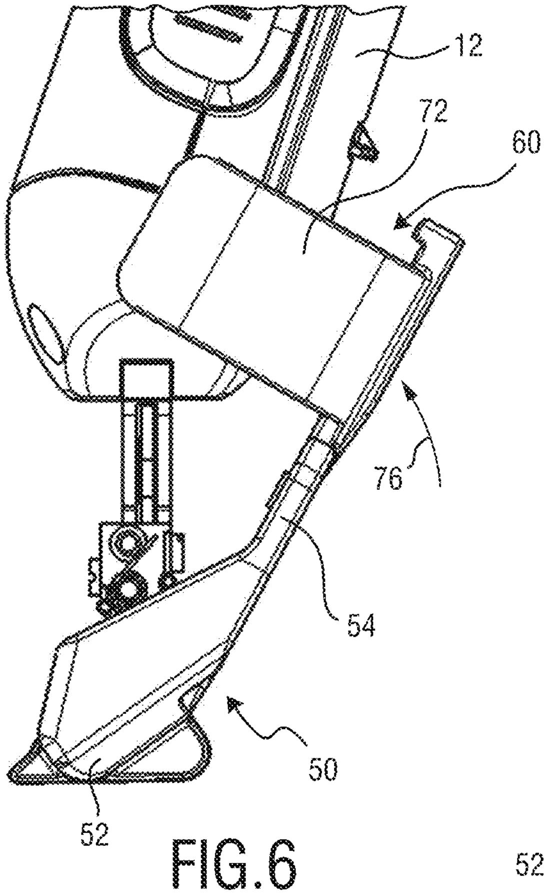
FIG. 6 is a further partial side view of the arrangement illustrated in FIG. 5, wherein a mounting portion of the attachment comb approaches a housing portion of the appliance.
Figure 7:
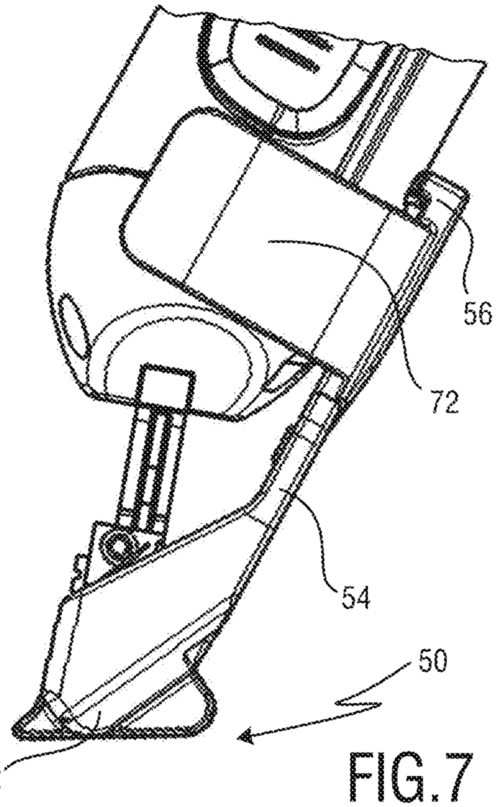
FIG. 7 is yet another partial side view of the arrangement in accordance with FIGS. 5 and 6, wherein the mounting portion engages the housing portion.

FIGS. 5, 6 and 7 illustrate an exemplary mounting procedure of the attachment comb 50. With reference to FIG. 5, at an initial state, the attachment comb 50 may approach the blade set 20 in the mounting direction 74 so that the blade set 20 may contact the orientation determining portion 62. This may particularly involve contacting the frontal contact surface 67 with a frontal end of the blade set 20. The respective mounting motion may be referred to as substantially rectilinear motion. In a further stage, illustrated in FIG. 6, the attachment comb 50 which may be already in contact with the blade set 20 may be swiveled together with the blade set 20 in a swiveling mounting direction 76. Consequently, the mounting portion 60 may approach the housing portion 12 of the hair cutting appliance 10.

Mounting the mounting portion 60 to the housing portion 12 may include a snap-on mounting of the mounting portion 60. To this end, at least in some embodiments, the mounting portion 60 may comprise at least one side clip 72, particularly a pair of side clips that are arranged in an opposite manner with respect to each other. The side clips 72 may engage opposite lateral sides of the housing portion 12. The side clips 72 may pull the locking engagement element 56 in contact with the mounting contour 90 at the housing portion 12. Consequently, the attachment comb 50 may be releasably attached to the housing portion 12 in a predefined snap-on manner. Attaching the attachment comb 50 in a predefined orientation may include bringing the blade set 20 into its locking orientation.

With further reference to FIGS. 8 to 15, a further exemplary embodiment of an attachment comb 50' for a hair cutting appliance 10 will be further detailed and described. As can be best seen from FIGS. 8, 12 and 13, the attachment comb 50' may be attached to a housing or housing portion 12 of the hair cutting appliance 10 which may also include engaging a blade set 20 of the hair cutting appliance 10. It should be further noted that a swiveling mechanism for the blade set 20 is hidden in FIGS. 8 to 15 for illustrative purposes. Generally, the blade set 20 and the swiveling mechanism may be arranged in accordance with the exemplary embodiment of the swiveling mechanism 40 illustrated in FIG. 2. As can be best seen from FIGS. 8 and 9, the attachment comb 50' may comprise a supporting frame 52', particularly a supporting frame 52' shaped in a loop-like fashion. As can be best seen from FIGS. 8 and 10, the attachment comb 50' may comprise a spacing guard element 58 which may comprise a plurality of comb teeth 66. The spacing guard element 58 may space or offset the top surface 32 of the blade set 20 from the user's skin in a predefined manner to enable trimming hairs at a predefined length. For illustrated purposes, the spacing guard element 58 is hidden in FIGS. 9 and 11 to 15. In some embodiments, the spacing guard element may be referred to as an adjustable spacing guard element 58. It may be therefore preferred that the spacing guard element 58 may be adjusted to modify a spacing between the blade set 20 and the user's skin.

The attachment comb 50' may further comprise a mounting portion 60 comprising a retaining element 80, particularly a retaining hook. The retaining element 80 may also be referred to, at least in some embodiments, as a resilient retaining element 80. The retaining element 80 may be integrally formed with or mounted at the supporting frame 52'. It is particularly preferred that the retaining element 80 is a deflectable retaining element which may be operated or actuated for selectively locking or disengaging the attachment comb 50'. A deflecting operating motion of the retaining element 80 in indicated in FIG. 12 by a curved double-arrow denoted by reference numeral 82. The retaining element 80 may be arranged to cooperate with a mounting contour 90 at the housing portion 12.

Figure 9:
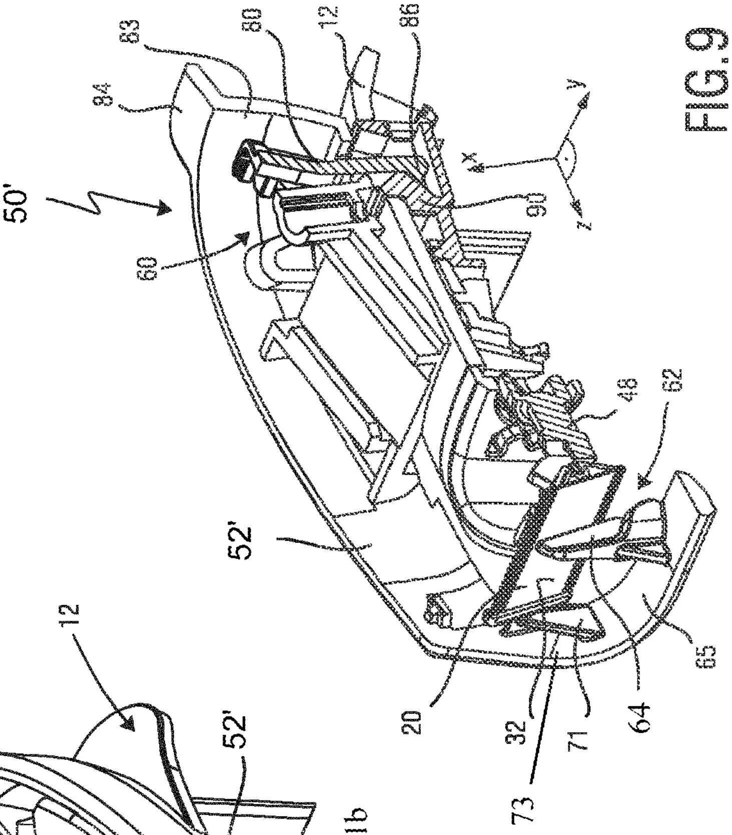
FIG. 9 is a cross-sectional view of the attachment comb shown in FIG. 8, wherein a spacing guard element of the attachment comb is hidden for illustrative purposes.
Figure 8:
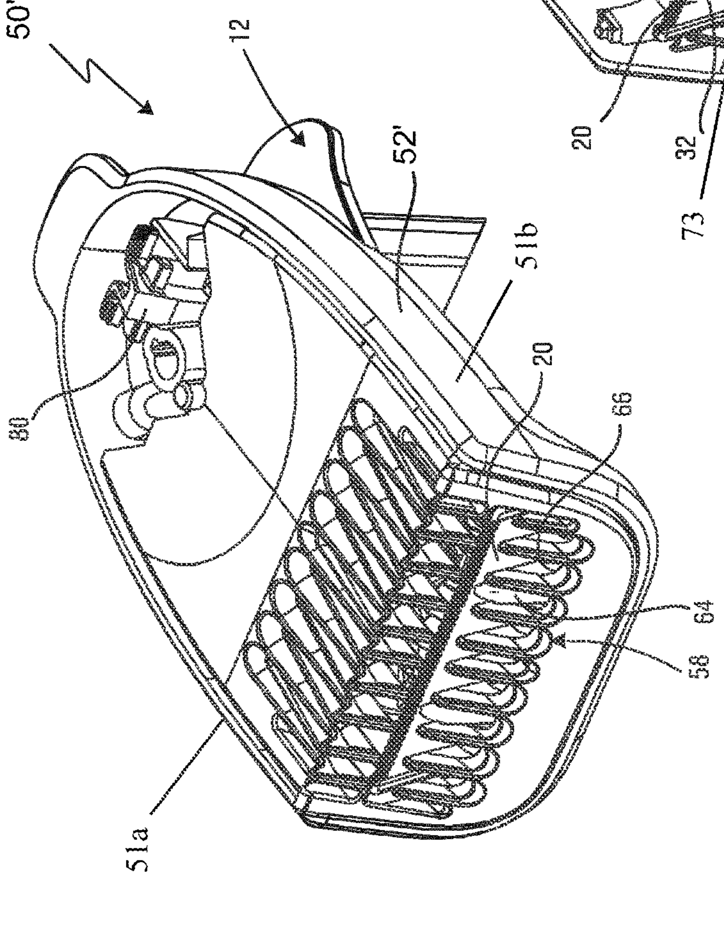
FIG. 8 is a perspective top view of yet another exemplary embodiment of an attachment comb, the attachment comb being mounted to a housing portion and engaging a blade set.
Figure 11:
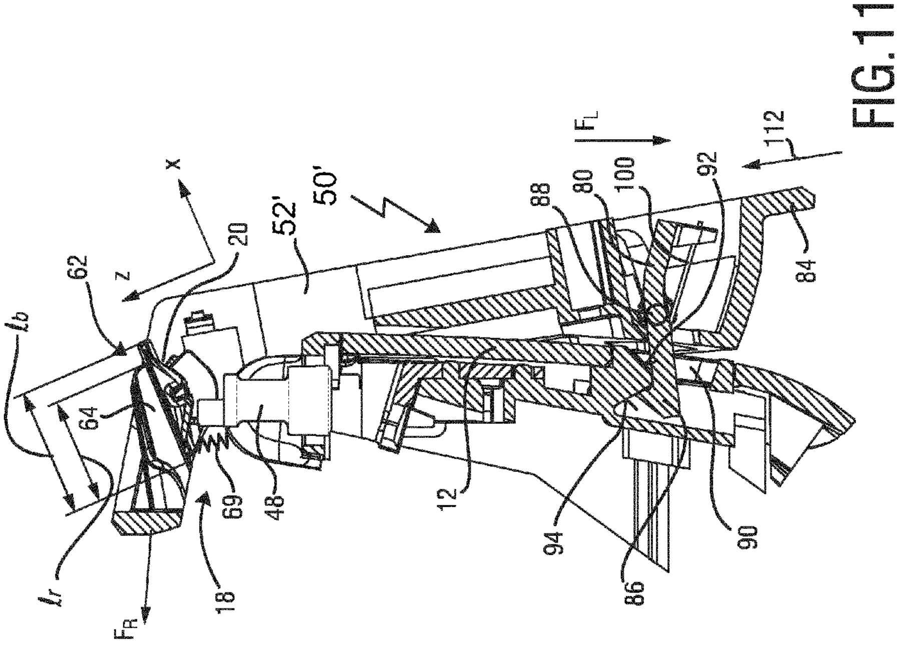
FIG. 11 is a cross-sectional side view of the arrangement shown in FIG. 10 along the line XI-XI in FIG. 10.
Figure 12:
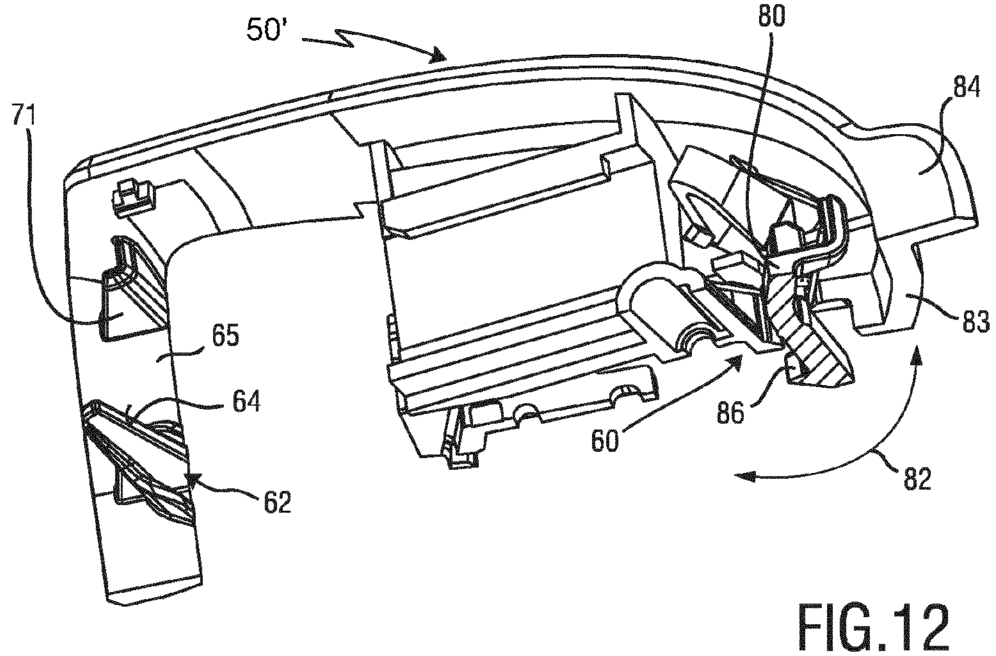
FIG. 12 is a perspective cross-sectional rear view of an attachment comb for a hair cutting appliance, wherein a spacing guard element is hidden in FIG. 12 for illustrative purposes.

As can be best seen from FIGS. 9, 11 and 12, the attachment comb 50' may be further provided with an orientation determining portion 62 which may comprise at least one receiving seat 64 which may contact the top surface 32 of the blade set 20 in the mounted state of the attachment comb 50'. By way of example, the orientation determining portion 62 may comprise a first receiving seat 64 and a second receiving seat 64 between first and second lateral sides 51*a*, 51*b* of the attachment comb 50' as shown in FIG. 8, refer also to FIG. 10. The at least one receiving seat 64 may extend from a top portion 65 of the support beam 54. The orientation determining portion 62 may further comprise at least one lateral guide element 71. Preferably, a first guide element 71 and a second lateral guide element 71 are provided that are arranged to guide lateral ends of the blade set 20 so as to define the lateral position (Y-position) of the blade set 20. Consequently, the attachment comb 50' and the blade set 20 may be entirely aligned in the mounted state. As shown in FIG. 9, the first quide element 71 extends from the top portion 65 of the support beam 54, and is offset from the first lateral sides 51*a* leaving a gap 73 between the first lateral sides 51*a* and the first quide element 71.

As can be best seen from FIG. 11, the receiving seat 64 may comprise a longitudinal extension $I_r$ that may cover at least a substantial portion of a longitudinal dimension $I_b$ of the blade set 20. This may basically prevent a faulty mounting of the attachment comb 50' which might include engaging a bottom side (rather than the top surface 32) of the blade set. It is therefore preferred that the longitudinal coverage of the blade set by the at least one receiving seat 64 exceeds at least half the length of the longitudinal extension $I_b$ of the blade set 20.

Generally, the at least one receiving seat 64 may be arranged as a tab or tooth extending from the supporting frame 52'. As can be best seen from FIG. 8, the at least one receiving seat 64 may be arranged in slots between the comb teeth 66 of the spacing guard element 58. Consequently, the at least one spacing guard element 58 generally does not interfere with the comb teeth 66. In some embodiments, the spacing guard element 58 and the orientation determining portion 62 may be at least sectionally integrally formed. This applies in particular when the spacing guard element 58 is a non-adjustable spacing guard element 58. In this context, the at least one receiving seat 64 may be arranged at a rear or bottom side or at least some of the comb teeth 66.

The attachment comb 50' may further comprise a handling tab 84, particularly a disengagement handling tab 84. Generally, the handling tab may also be referred to as handle. The handling tab 84 may be arranged at a bottom portion 83 of the supporting frame 52'. The handling tab 84 may be actuated or operated by the user to disengage or release the attachment comb 50' from the hair cutting appliance 10.

Figure 10:
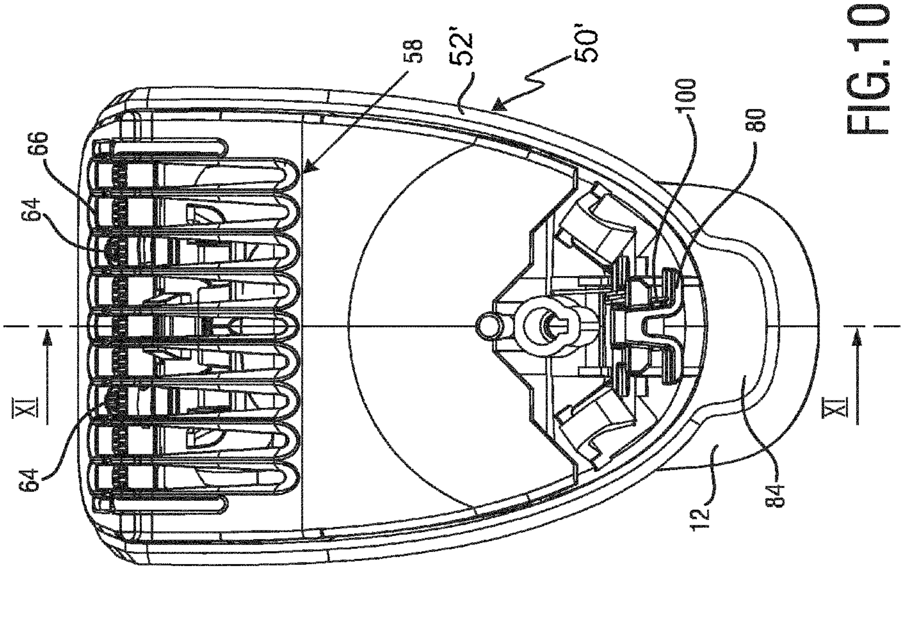
FIG. 10 is a rear view of the arrangement shown in FIG. 8.

With further reference to FIGS. 10 and 11, the retaining element 80 and the mounting contour 90 of an exemplary embodiment in accordance with the present disclosure will be further detailed. FIG. 11 shows a cross-sectional view of an attachment comb 50' which is attached to a housing portion 12 of a hair cutting appliance 10, refer also to the line XI-XI in FIG. 10. The retaining element 80 may be arranged as a deflectable retaining hook. The retaining element 80 may be pivotably mounted at the supporting frame 52'. To this end, a pivot or mounting pivot 88 may be provided. The retaining element 80 may swivel about the pivot 88, refer to the curved double-arrow indicated by reference number 82 in FIG. 12. Generally, the attachment comb 50', particularly the supporting frame 52' thereof, may be adapted to an outer contour of the housing portion 12 exemplarily illustrated in FIG. 13. The retaining element 80 may comprise a tip 86 which may be configured to engage the mounting contour 90 at the housing portion 12. The mounting contour 90 may comprise a slide ramp surface 92 and an engagement surface 94.

Figure 13:
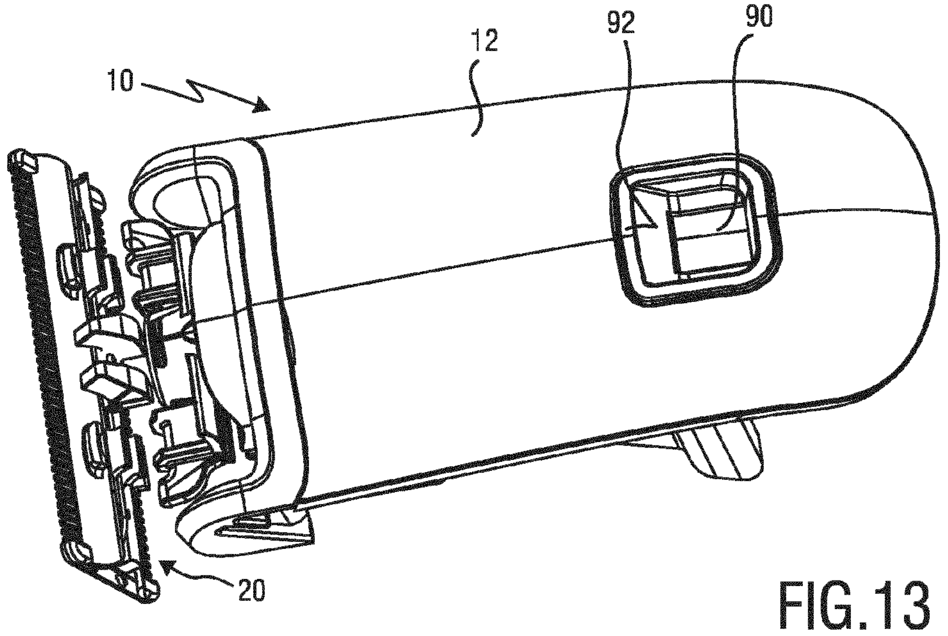
FIG. 13 is a partial perspective rear view of a hair cutting appliance in an orientation that is adapted to the orientation of FIG. 12.

As can be best seen from FIG. 13, the slide ramp surface 92 may be basically outwardly oriented. The engagement surface 94 may be basically inwardly oriented (with respect to the housing portion 12). The engagement surface 94 may also be regarded as locking element of the mounting contour 90. At the engagement surface 94, the tip 86 of the retaining element 80 may be locked. Consequently, the attachment comb 50' may be locked at the housing portion 12. The attachment comb 50' may further comprise a biasing element 100, particularly a spring element 100 for the retaining element 80. The biasing element 100 may generally urge the retaining element 80 into engagement with the mounting contour 90. Given the exemplary orientation of the attachment comb 50' shown in FIG. 11, the biasing element 100 may apply a rotation force to the retaining element 80 that tends to urge the retaining element 80 into clockwise rotation. It should be noted in this context that the above term "clockwise" shall not be construed in a limiting manner but shall be rather regarded as an exemplary configuration of the biasing element 100 and the retaining element 80.

Figure 15:
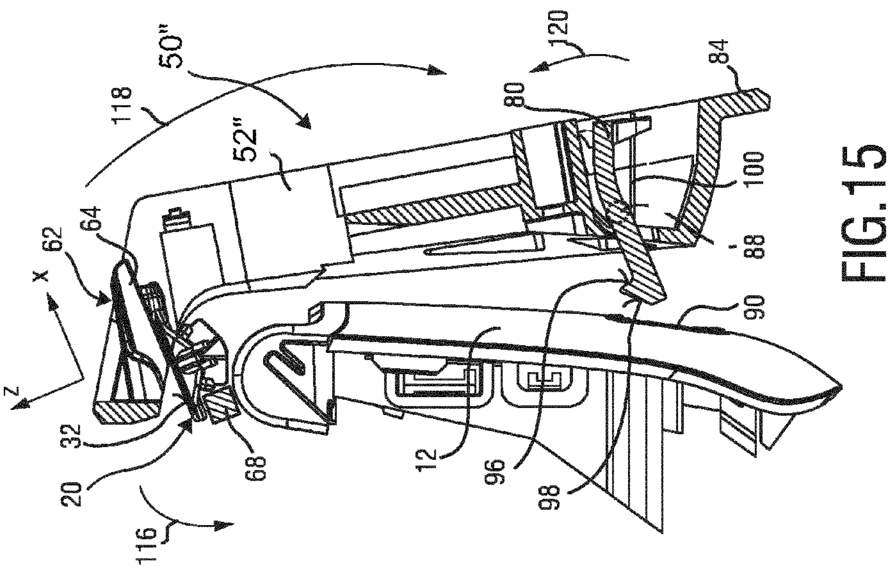
FIG. 15 is another illustration of the attachment comb and the hair cutting appliance in accordance with FIG. 14, wherein an orientation determining portion of the attachment comb engages a blade set, and wherein a retaining element of the attachment comb approaches a mounting contour of a housing portion of the hair cutting appliance.

As can be best seen from FIGS. 13 and 15, the retaining element 80 may further comprise, at the tip 86, a retaining surface 96 and a slide surface 98. Basically the slide surface 98 may be arranged to cooperate with the slide ramp surface 92 of the mounting contour 90 upon insertion of the tip 86 of the retaining element 80 into the mounting contour 90. The slide surface 98 may slide at the slide ramp surface 92 such that the retaining element 80 may be deflected against the biasing force of the biasing element 100. Consequently, the tip 86 can enter the mounting contour 90, wherein the retaining surface 96 may engage or contact the engagement surface 94 to lock the retaining element 80 and, consequently, the attachment comb 50'.

Further reference is made to FIG. 11. FIG. 11 illustrates the attachment comb 50' in the mounted state. In the mounted state, the attachment comb 50', particularly the orientation determining portion 62 thereof, may bring the blade set 20 into a predefined orientation suitable for trimming. Generally, the blade set 20 may be coupled to a biasing element or spring element 69 which may be attached to or associated with the housing portion 12. The spring element 69 is schematically shown in FIG. 11 for illustrative purposes. Further reference in this regard is made to the spring element 69 illustrated in FIG. 4. Generally, the spring element 69 may be configured to urge the blade set 20 into a predefined neutral swiveling orientation, refer to FIG. 14, for instance. Consequently, as shown in FIG. 11, the orientation determining portion 62 may act against the spring element 69. Therefore, the blade set 20 may be kept in the locking orientation suitable for trimming in a biased of preloaded state, basically without considerable play.

As can be further seen in FIG. 11, the biasing element 100 may basically pull the orientation determining portion 62 into a defined engagement with the blade set 20. A direction of a locking force that is attributable to by the biasing element 100 and applied by the retaining element 80 is indicated in FIG. 11 by $F_L$. Given the actual orientation of the blade set 20 in the mounted state, refer to the (blade set) coordinate system indicated in FIG. 11, the locking force $F_L$ may cause, at a top end adjacent the blade set 20, a resulting retaining force $F_R$ which basically prevents a release motion of the attachment comb 50' in the longitudinal direction X. Consequently, the attachment comb 50' may be regarded as a self-aligning attachment comb 50'. The desired locking orientation of the blade set 20 may further improve a mating fit of the attachment comb 50'. The attachment comb 50' may be also referred to as self-retaining or self-locking attachment comb 50'.

As already mentioned above, the attachment comb 50' may be further provided with a handle or handling tab 84 which may be integrally formed with and extend from the supporting frame 52'. The user may actuate the handling tab 84 to disengage the attachment comb 50'. A respective actuation direction is indicated in FIG. 11 by an arrow denoted by reference number 112. Pushing the handling tab 84 in the disengagement direction 112 may rotate or swivel the retaining element 80. Given the exemplary configuration illustrated in FIG. 11, the retaining element 80 may be rotated counterclockwise upon pushing the handling tab 84 in the disengagement direction 112. Consequently, the tip 86, particularly the retaining surface 96 (refer to FIG. 15) of the retaining element 80 may be disengaged from the engagement surface 94. In this way, the retaining element 80 may be released from engagement with the mounting contour 90. Hence, the attachment comb 50' may be released from the hair cutting appliance 10. In other words, at least in some embodiments, the attachment comb 50' may be regarded as a single-step release attachment comb 50'. Disengaging the retaining element 80 may generally involve rolling or sliding the retaining element 80 over the slide ramp surface 92 which may induce the swivel motion of the retaining element 80. Consequently, the tip 86 may surmount and apex point between the slide ramp surface 92 and the engagement surface 94 of the mounting contour 90.

Figure 14:
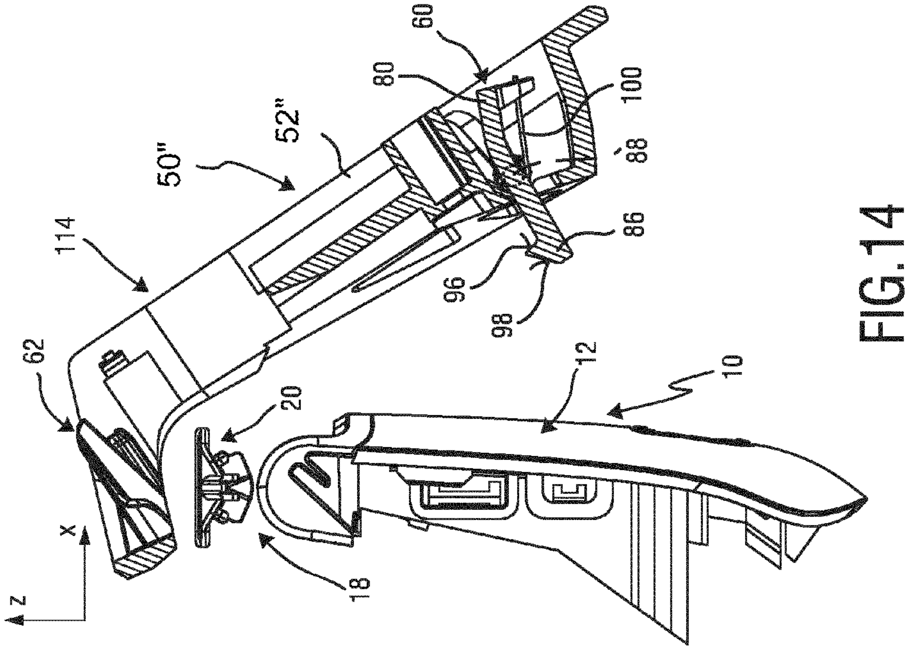
FIG. 14 is a partial cross-sectional side view of an attachment comb approaching a blade set of a cutting head of a hair cutting appliance.

With particular reference to FIG. 14 and FIG. 15, a mounting process of the attachment comb 50' will be further described. As can be seen in FIG. 14, the blade set 20 of the cutting head 18 may assume a basically neutral orientation (refer to the coordinate axes X, Z) when no external load or force is applied thereto. The attachment comb 50' may be fed to the hair cutting appliance 10 in a mounting direction 114. Particularly, the orientation determining portion 62 may approach the blade set 20. As can be best seen in FIG. 15, the orientation determining portion 62, particularly the at least one receiving seat 64 thereof, may urge the blade set 20 towards a locking orientation when the orientation determining portion 62 contacts the top surface 32 of the blade set 20 (refer to the inclined coordinate axes X, Z in FIG. 15). A respective swivel motion of the blade set 20 is indicated by a curved arrow denoted by reference number 116 in FIG. 15.

Basically, the blade set 20 and the at least one receiving seat 64 may be put into alignment upon mounting the attachment comb 50'. As already mentioned in connection with the embodiment illustrated in FIG. 11, the blade set 20 may be urged against a spring element 69. However, as can be seen in FIG. 15, in yet another embodiment, the blade set 20 may be urged against a limit stop member 68. However, this embodiment may still involve a spring element 69 provided at the blade set. The limit stop member 68 may be attached to or associated with the housing portion 12. Once the blade set 20 is brought into the desired orientation, the attachment comb 50', particularly the supporting frame 52' thereof, may be brought into contact with the housing portion 12. This may basically involve rotating or pivoting the attachment comb 50' to bring it into alignment with the housing portion 12, refer to a curved arrow designated by reference number 118 in FIG. 15.

In this way, the retaining element 80 may contact the mounting contour 90 at the housing portion 12. This may involve a sliding contact (also a combined sliding and rolling contact) of the slide surface 98 with the slide ramp surface 92, refer also to FIG. 11. Consequently, the retaining element 80 may be deflected (e.g. pivoted about the pivot 88) so that the slide surface 98 may surmount the slide ramp surface 92, refer to a curved arrow in FIG. 15 indicated by reference number 120. In the course of this, the retaining surface 96 may engage the engagement surface 94 at the mounting contour 90. Consequently, the attachment comb 50' may be aligned with and locked at the housing portion 12. This may have the advantage that the user of the device does not have to directly actuate the retaining element 80 for engaging the mounting contour 90. Basically the same may apply when the attachment comb 50' is disengaged from the hair cutting appliance 10. The retaining element 80 may be therefore regarded as mediately actuable retaining element 80.

Figure 16:
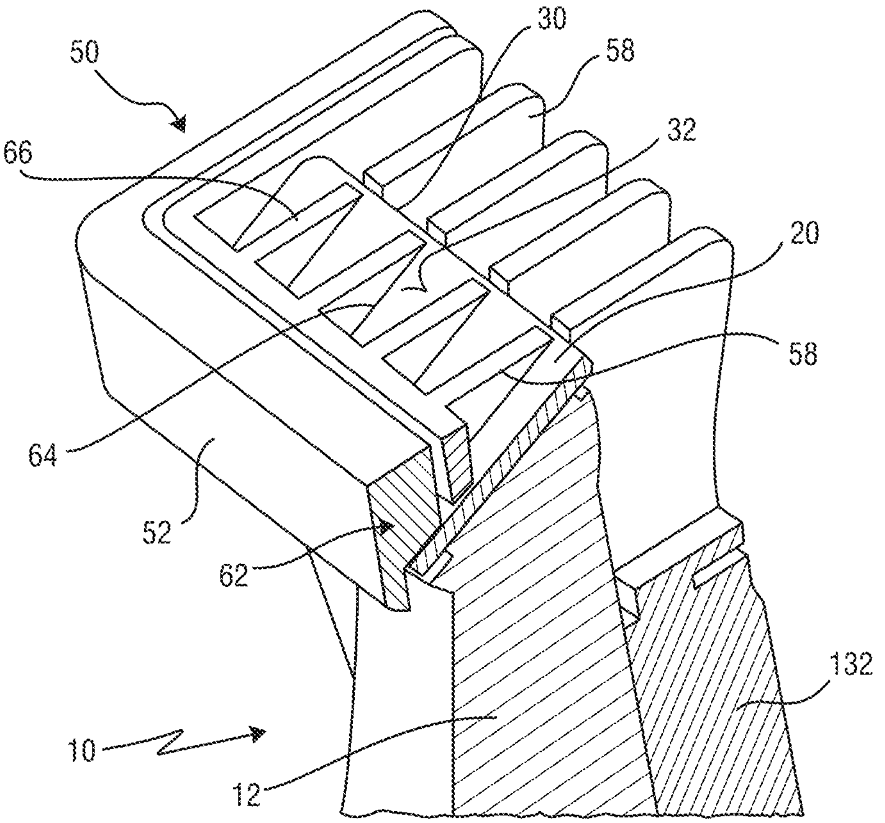
FIG. 16 is a simplified partial cross-sectional perspective top view of a hair cutting appliance fitted with an attachment comb.
Figure 17:
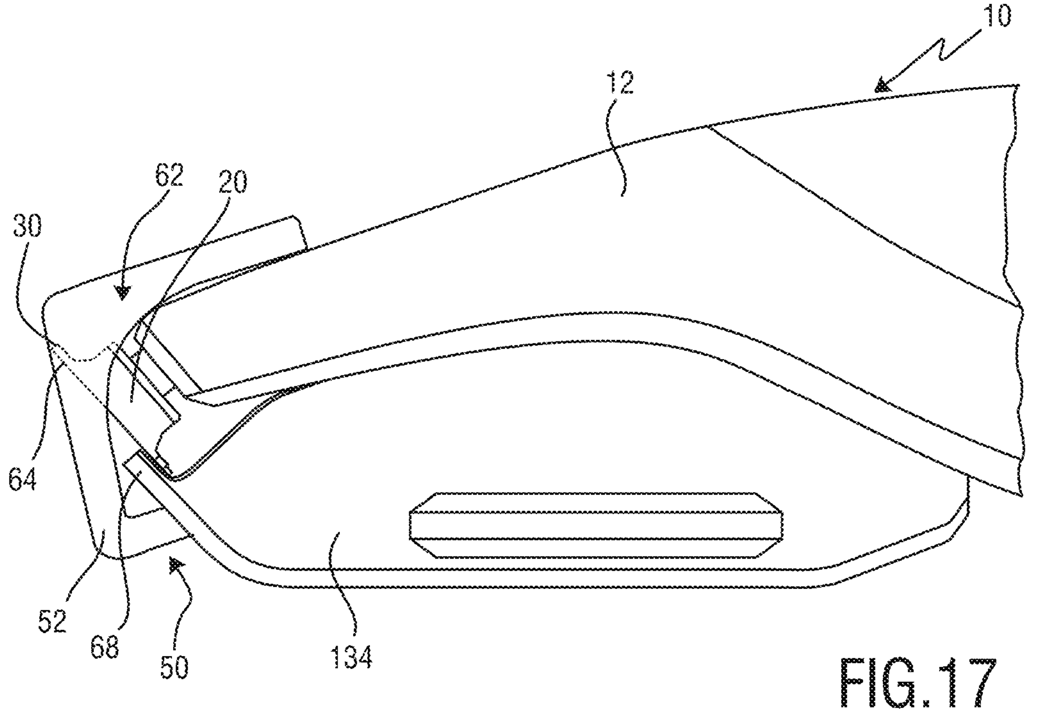
FIG. 17 is a further partial side view of a hair cutting appliance fitted with an attachment comb.

With further reference to FIGS. 16 and 17 alternative mounting configurations of exemplary attachment combs 50'', 50''' for hair cutting appliances 10 will be illustrated and further discussed. The embodiment illustrated in FIG. 16 may be basically referred to as back pack attachment comb 50". The back pack attachment comb 50" may generally correspond to the embodiments illustrated in FIGS. 8 to 15. The back pack attachment comb 50" may be regarded as an attachment comb 50" which is attachable to a back side or rear side of the housing portion 12 of the hair cutting appliance 10. An attachment housing 132 of the back pack attachment comb 50" is indicated by reference number 132 in FIG. 16.

FIG. 17 illustrates an alternative embodiment of an attachment comb 50'''. The attachment comb 50''' may be regarded as front pack attachment comb 50'''. In other words, the attachment comb 50''' of FIG. 17 may be attachable to a front side of the hair cutting appliance 10 which is opposite to the back side illustrated in FIG. 16. A respective attachment housing 134 that is adapted to a front side of the housing portion 12 of the hair cutting appliance 10 is indicated in FIG. 17 by reference number 134. Also a front pack attachment comb 50''' may be mounted to the hair cutting appliance 10 such that the blade set 20 is brought into a predefined locking orientation suitable for trimming.

With further reference to FIGS. 16 and 17, it shall be further observed that the at least one receiving seat 64 of the orientation determining portion 62 may be generally integrally formed with the comb teeth 66 of the spacing guard element 58. Such an arrangement may be envisaged when a spacing guard element 58 is utilized that is basically not adjustable with respect to its spacing length. Consequently, the position of the comb teeth 66 with respect to the blade set 20 is basically fixed in the mounted state. Therefore, the comb teeth 66 may form the receiving seat 64 for the top surface 32 of the blade set 20. However, when a spacing guard element 58 is utilized which is adjustable in length, it may be preferred to provide separate receiving seats 64 that may form the orientation determining portion 62, refer also to FIG. 8 and FIG. 9.

Generally, the back side of the housing of the hair cutting appliance 10 may be regarded as the side from which the top surface 32 of the blade set 20 is turned away in the mounted state of the attachment comb 50. Generally, the front side of the housing of the hair cutting appliance 10 may be regarded as the side to which the top surface 32 of the blade set 20 is turned in the mounted state of the attachment comb 50.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A hair cutting appliance configured to be moved through hair in a moving direction to cut the hair, said hair cutting appliance comprising:

a housing;

a blade set configured to pivotably move during a shaving mode with respect to the housing and be in a locking orientation during a hair trimming mode; and a releasable attachment comb configured to be coupled to the housing in the hair trimming mode and to fix the blade set in the locking orientation during the hair trimming mode, the releasable attachment comb comprising:

a supporting frame, and a mount having a hook, the hook pivotably attached to the supporting frame and configured to be attached to the housing of the hair cutting appliance, wherein the releasable attachment comb comprises an orientation determiner configured to engage the blade set and to define the locking orientation of the blade set and fix the blade set in the locking orientation in the hair trimming mode when the releasable attachment comb is mounted to the housing, and wherein the orientation determiner of the releasable attachment comb is configured to swivel the blade set against a swivel limit stop associated with the housing in response to attachment of the releasable attachment comb to the housing.

2. The hair cutting appliance of claim 1, wherein the hair cutting appliance further comprises a swivel configured to couple the blade set to the housing of the hair cutting appliance, and wherein the orientation determiner of the releasable attachment comb is configured to block the swivel to attain the locking orientation during the hair trimming mode.

3. The hair cutting appliance of claim 1, wherein the hook has a sliding surface configured to cooperate with a sliding ramp surface associated with a mounting contour at the housing, and wherein the sliding surface and the sliding ramp surface deflect the hook upon mounting the attachment comb such that a retaining surface of the hook engages an engagement surface associated with the mounting contour.

4. The hair cutting appliance of claim 1, wherein the hook is a resilient snap-on hook, wherein the resilient snap-on hook is configured to engage a mounting contour at the housing, wherein the resilient snap-on hook biases against the mounting contour when mounted to the housing, wherein the resilient snap-on hook is configured to apply an alignment force to the housing when mounted to the housing to urge the blade set into the locking orientation, and wherein the alignment force urges the orientation determiner into engagement with the blade set to attain the locking orientation of the blade set in the hair trimming mode.

5. The hair cutting appliance of claim 1, wherein the orientation determiner includes a guide configured to contact and guide the blade set for aligning the blade set with the releasable attachment comb in the mounted state, and wherein the guide is offset away from a first lateral side of lateral sides of the supporting frame leaving a gap between the guide and the first lateral side.

6. The hair cutting appliance of claim 1, wherein the releasable attachment comb comprises a handling tab, and wherein the handling tab is configured to disengage the hook from the housing in response to pushing the handling tab in a disengagement direction, the disengagement direction being parallel to the supporting frame.

7. The hair cutting appliance of claim 1, wherein the releasable attachment comb comprises at least one spacing guard, the at least one spacing guard configured to space the blade set from a working surface when in operation, and wherein the at least one spacing guard of the releasable attachment comb is located at a first end of the supporting frame of the releasable attachment comb and the hook is located at a second end of the supporting frame opposite the first end.

8. The hair cutting appliance of claim 1, wherein the hook is rotatably movable between an engagement position for engaging the housing of the hair cutting appliance and a disengagement position for disengaging from the housing, and wherein the hook extends away from the supporting frame in both the engagement position and the disengagement position.

9. A hair cutting appliance configured to be moved through hair in a moving direction to cut the hair, said hair cutting appliance comprising:

a housing;

a blade set configured to pivotably move during a shaving mode with respect to the housing; and a releasable attachment comb configured to be releasably coupled to the housing in a hair trimming mode and configured to fix the blade set in a locking orientation during the hair trimming mode when coupled to the housing to prevent pivotal movement of the blade set in both clockwise and counter-clockwise directions, wherein the hair cutting appliance is configured for the blade set to be released from the locking orientation in response to removal of the releasable attachment comb from the housing, wherein the releasable attachment comb includes a supporting frame and an orientation determiner, the orientation determiner being configured to engage the blade set and to define the locking orientation of the blade set and fix the blade set in the locking orientation in the hair trimming mode when the releasable attachment comb is in a mounted state, where the releasable attachment comb is mounted to the housing in the mounted state, and wherein the orientation determiner of the releasable attachment comb is configured to swivel the blade set against a blade set orientation biasing force applied by a biaser associated with the housing in response to attachment of the releasable attachment comb to the housing.

10. The hair cutting appliance of claim 9, wherein the releasable attachment comb comprises:

a mount having a hook, and a mounting pivot, the hook being rotatably attached to the supporting frame by the mounting pivot, and the hook being configured to be attached to the housing of the hair cutting appliance.

11. The hair cutting appliance of claim 9, wherein the hair cutting appliance comprises a swivel configured to couple the blade set to the housing of the hair cutting appliance, and wherein the orientation determiner of the releasable attachment comb is configured to block the swivel to attain the locking orientation during the hair trimming mode.

12. The hair cutting appliance of claim 9, wherein the orientation determiner includes a receiving seat that contacts a top surface of the blade set when the releasable attachment comb is in the mounted state, and wherein a length of the receiving seat exceeds at least half a length of the blade set.

13. A hair cutting appliance, comprising:

a housing;

a blade set configured to pivotably move during a shaving mode with respect to the housing for shaving hair and to be in a locking orientation during a hair trimming mode for trimming hair; and a releasable attachment comb comprising:

teeth;

a supporting frame;

a hook;

a handling tab; and an orientation determiner, wherein the orientation determiner is configured to engage the blade set and to define the locking orientation of the blade set and fix the blade set in the locking orientation in the hair trimming mode to enable trimming of the hair by the blade set when the releasable attachment comb is in a mounted state, and to swivel the blade set against a swivel limit stop in response to the releasable attachment comb being mounted to the housing in the mounted state, and wherein the handling tab is configured to rotate the hook to a disengagement position to disengage the hook from the housing in response to pushing the handling tab in a disengagement direction, wherein the disengagement direction is parallel to the supporting frame.

14. The hair cutting appliance of claim 13, wherein the orientation determiner of the releasable attachment comb is configured to block a swivel of the hair cutting appliance to attain the locking orientation during the hair trimming mode when the releasable attachment comb is mounted to the housing.

15. The hair cutting appliance of claim 13, wherein the orientation determiner includes a receiving seat that is configured to contact a top surface of the blade set when the releasable attachment comb is in the mounted state.

16. The hair cutting appliance of claim 13, wherein the hook is a resilient snap-on hook, wherein the resilient snap-on hook is configured to engage a mounting contour at the housing, wherein the resilient snap-on hook biases against the mounting contour when mounted to the hair cutting appliance, wherein the resilient snap-on hook is configured to apply an alignment force to the housing when mounted to the hair cutting appliance, wherein the alignment force urges the orientation determiner into engagement with the blade set, and wherein the releasable attachment comb is configured to urge the blade set into the locking orientation.

17. The hair cutting appliance of claim 13, comprising at least one spacing guard configured to space the blade set from a working surface when in operation.

18. The hair cutting appliance of claim 17, where the at least one spacing guard of the releasable attachment comb is located at a first end of the supporting frame and the hook is located at a second end of the supporting frame opposite the first end.

19. The hair cutting appliance of claim 13, wherein the supporting frame has a portion between lateral sides, wherein the orientation determiner includes a guide configured to contact and guide the blade set for aligning the blade set with the releasable attachment comb when the releasable attachment comb is in the mounted state, the guide being offset away from a first lateral side of the lateral sides leaving a gap between the guide and the first lateral side, wherein the guide has a linear shape, and wherein the hook is configured to rotate in a counter-clockwise direction to disengage from the housing in response to pushing the handling tab in the disengagement direction.

* * * * *